United States Patent [19]

Peleus

[11] Patent Number: 4,658,992
[45] Date of Patent: Apr. 21, 1987

[54] APPARATUS FOR CONTROLLABLY DISCHARGING POWDER AND/OR PELLETS FROM A HOPPER

[75] Inventor: Agne Peleus, Malmo, Sweden

[73] Assignee: Peleus & Co. KB, Malmo, Sweden

[21] Appl. No.: 843,847

[22] Filed: Mar. 27, 1986

Related U.S. Application Data

[63] Continuation-in-part of Ser. No. 471,444, Mar. 2, 1983, abandoned.

[51] Int. Cl.$^4$ ............................................. B65G 65/40
[52] U.S. Cl. .................................. 222/199; 222/200; 222/503; 222/505; 222/517; 222/547; 222/556; 198/532; 198/534; 414/412
[58] Field of Search ............... 222/161, 196, 199, 200, 222/502, 503, 506, 508, 517, 547, 564, 459, 556; 105/289; 198/532, 534

[56] References Cited

U.S. PATENT DOCUMENTS

| | | | |
|---|---|---|---|
| 1,606,733 | 11/1926 | Haiss | 222/503 X |
| 3,040,939 | 6/1962 | McCollough | 222/503 |
| 3,091,368 | 5/1963 | Harley et al. | 222/200 X |
| 3,261,508 | 7/1966 | Wahl | 222/161 X |
| 3,343,725 | 9/1967 | Cannon | 222/503 X |
| 3,865,278 | 2/1975 | Gallati | 222/161 |
| 4,273,266 | 6/1981 | Snape | 222/199 |

FOREIGN PATENT DOCUMENTS

| | | | |
|---|---|---|---|
| 2504832 | 8/1975 | Fed. Rep. of Germany | 222/200 |
| 1415721 | 11/1975 | United Kingdom | 222/199 |

Primary Examiner—Joseph J. Rolla
Assistant Examiner—Frederick R. Handren
Attorney, Agent, or Firm—Fleit, Jacobson, Cohn & Price

[57] ABSTRACT

An apparatus for discharging powder and/or pellets from a hopper defining an outlet adjacent the base thereof. The apparatus includes a control member associated with the outlet to control the rate of flow of the powder and/or pellets and a chute located under the control member to receive the powder and/or pellets, there being an outlet from the chute through which the powder and/or pellets may be discharged.

11 Claims, 15 Drawing Figures

FIG. 5B
FIG. 5A
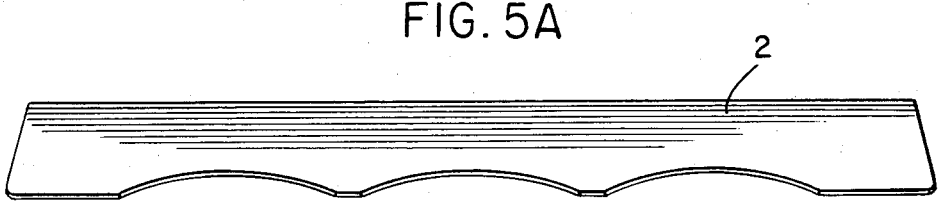
FIG. 5C
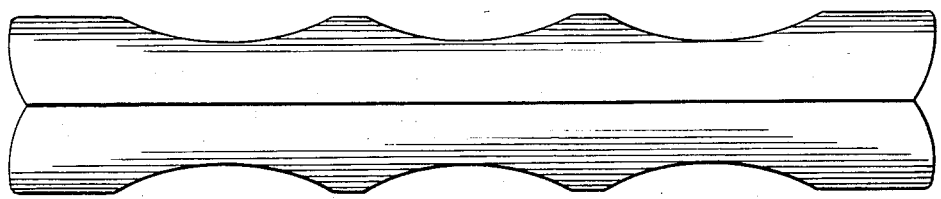
FIG. 6B
FIG. 6A
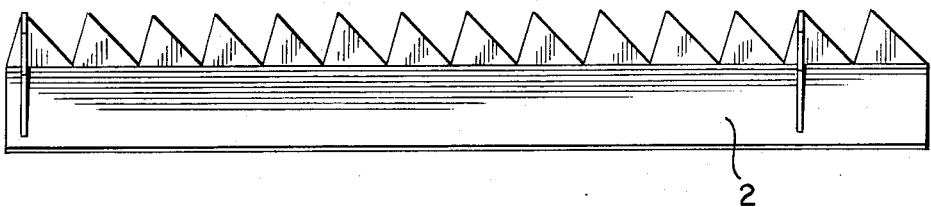
FIG. 6C
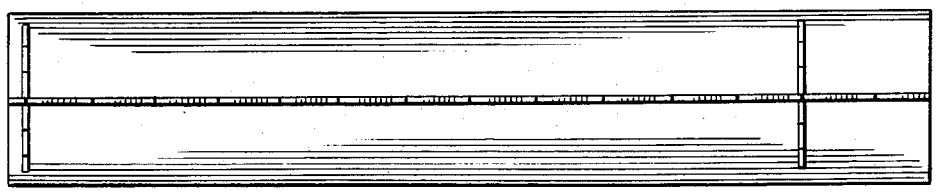

APPARATUS FOR CONTROLLABLY DISCHARGING POWDER AND/OR PELLETS FROM A HOPPER

This application is a continuation-in-part of application Ser. No. 471,444, filed Mar. 2, 1983, now abandoned.

DESCRIPTION OF INVENTION

The present invention relates to apparatus for controlling the discharge of powder and/or pellets from containers such as hoppers. In particular the invention relates to a device for use with a container having converging side walls adjacent the outlet through which the powder and/or pellets are discharged.

Conventionally powder and/or pellets may be stored in large hoppers. Usually such hoppers have converging side walls at the base thereof, and these converging side walls converge towards an outlet. Frequently a movable control member is provided to control the rate of discharge of the powder and/or pellets, this control member being movable to a position in which it closes the opening defined between the converging side walls. The control member may then be moved vertically to a position in which it is spaced from the side walls, thus permitting the powder and/or pellets to be discharged from the container. One disadvantage of this prior proposed arrangement is that the powder and/or pellets being discharged from the container inevitably impinge upon the control member and thus effectively form two streams of discharging material. Frequently these streams of discharging material are caused to flow in opposite directions.

The present invention provides an apparatus for discharging powder and/or pellets from a hopper defining an outlet adjacent the base thereof, said apparatus comprising a control member associated with the outlet to control the rate of flow of said powder and/or pellets and a chute located under the control member to receive the powder and/or pellets, there being an outlet from said chute through which the powder and/or pellets may be discharged.

In order that the invention may be more readily understood, and so that further features thereof may be appreciated, the invention will now be described, by way of example, with reference to the accompanying drawings in which:

FIGS. 5A, 5B and 5C show a control member with irregular edges, FIG. 5A shown in side view, FIG. 5B in diagrammatic transverse cross-section through FIG. 5A and FIG. 5C shown in top view of FIGS. 5A and 5B.

FIGS. 6A, 6B and 6C show a Y-shaped control member provided with cutting knives in a maximum angle of divergence, FIG. 6A shown in side view, FIG. 6B shown in diagrammatic transverse cross-section through FIG. 6A and FIG. 6C shown in top view of FIGS. 6A and 6B.

Figure 1:
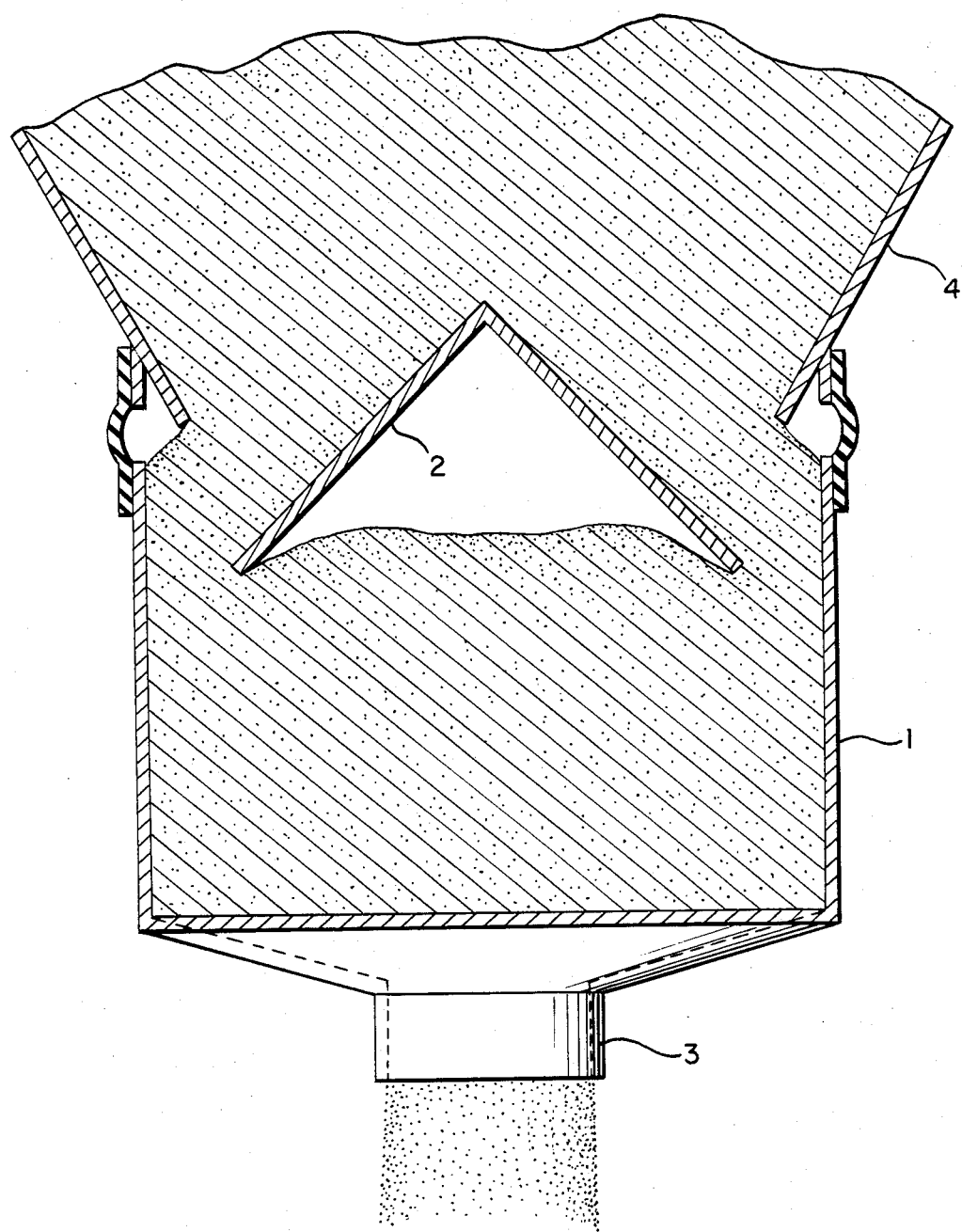
FIG. 1 is a cross sectional view through part of an outlet associated with a hopper.
Figure 2:
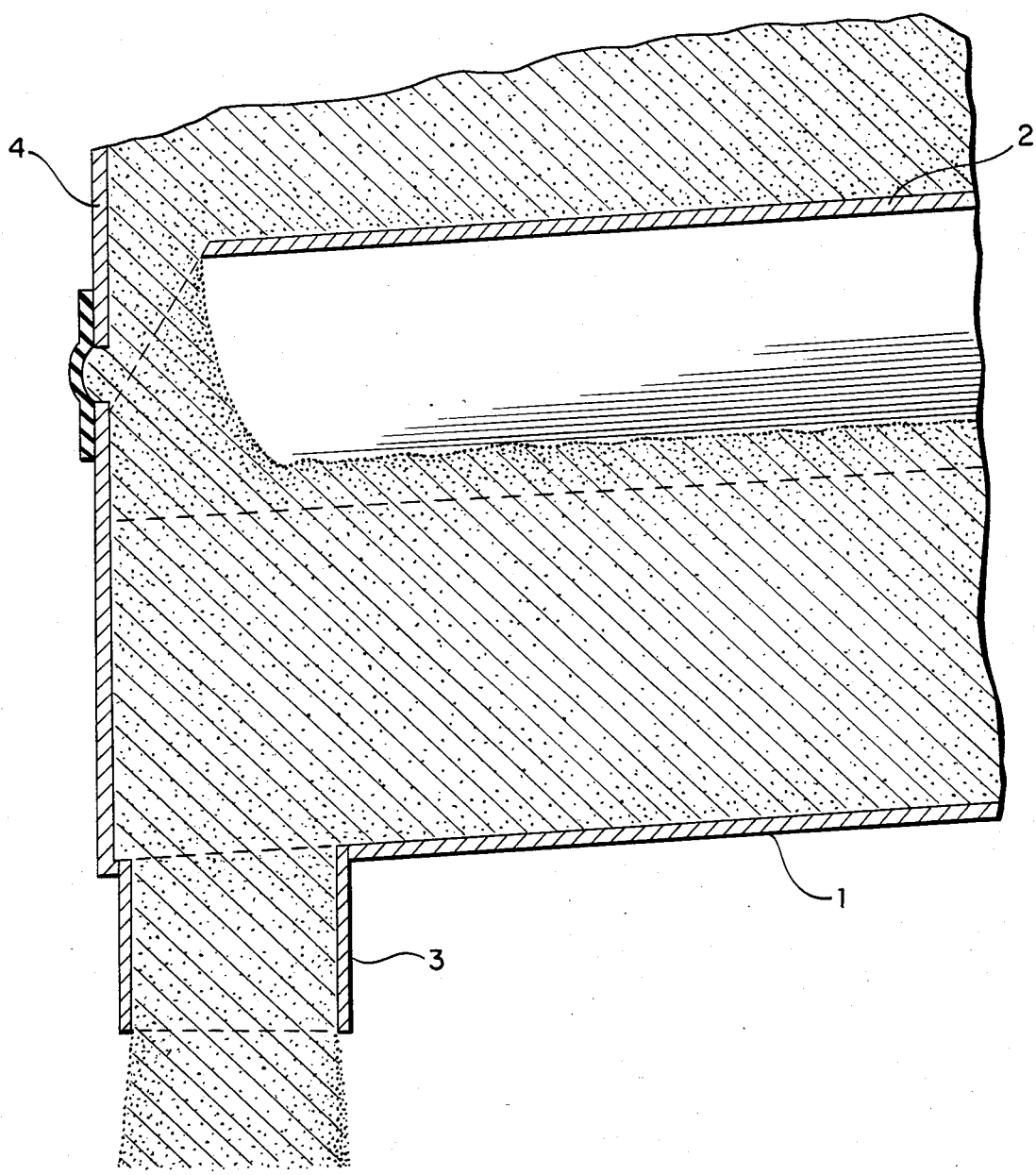
FIG. 2 is a vertical cross sectional view, taken perpendicular to the plane of FIG. 1, through part of the outlet shown in FIG. 1.

FIGS. 1 and 2 illustrate one embodiment of the invention. A hopper which contains a powder and/or granular material has converging side walls 4 in the lower region of the hopper. The hopper is mounted to be vibrated by a suitable means 7 (see FIG. 3B). Any suitable means may be used, for example an eccentric electric rotor or a pneumatically-operated reciprocating piston arrangement. A control member 2 is provided to control the discharge of the powder and/or granular material from the rectangular elongate aperture formed by the converging side walls 4 of the hopper. The control member is constituted by two elongate plates that are interconnected to form an inverted apex. The axis of this inverted apex is aligned with the axis of the aperture defined between the converging side walls of the hopper.

Located immediately beneath the control member is a chute 1, which is vibrationally mounted. The chute effectively comprises an elongate substantially "U" sectioned channel member, and the upper portions of the side walls of the channel member are connected to the opening mouth formed by the converging side walls of the hopper 4 by means of resilient interconnecting portions. Thus the hopper and the chute can vibrate relative to one another, but the powder and/or granular material cannot escape from the combination of the hopper and the chute.

The base of the chute is provided with at least one outlet conduit 3 extending downwardly from the base of the channel member that effectively defines the chute.

In operation of the described device either the hopper or the chute or both may be caused to vibrate, and the control member may be located appropriately relative to the opening mouth defined by the converging side walls 4 of the hopper. The powder and/or granular material will then flow evenly from the hopper and will accummulate within the chute 1. An even stream of powder and/or granular material will thus be discharged through the conduit 3.

It will be appreciated that the control member 2, in addition to controlling the rate of flow, serves to support the column of the powder and/or granular material, above the control member. Thus, the whole weight of the said column of material is not bearing down on the material emerging from the chute and the vibration is thus less likely to cause an undesirable compacting, and possible jamming, of the emerging material.

The control member may be so connected as to vibrate with the hopper and/or chute, or it may be vibrated independent, or it may be static and not vibrate at all. The arrangement which is chosen will largely depend upon the nature of the material being processed.

Figure 3A:
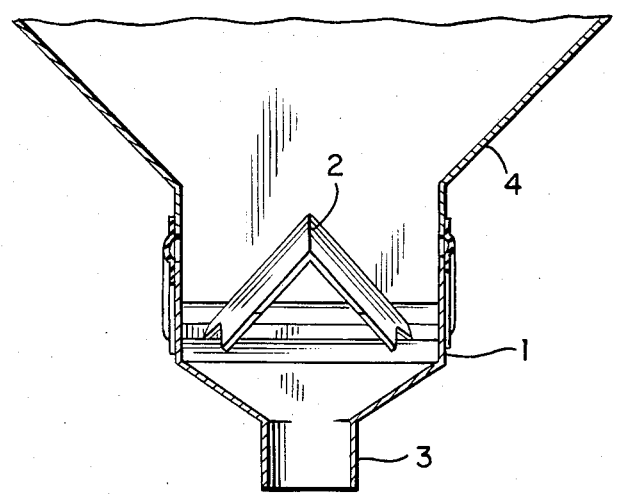
FIG. 3A is a diagrammatic cross-section through a chute.
Figure 3B:
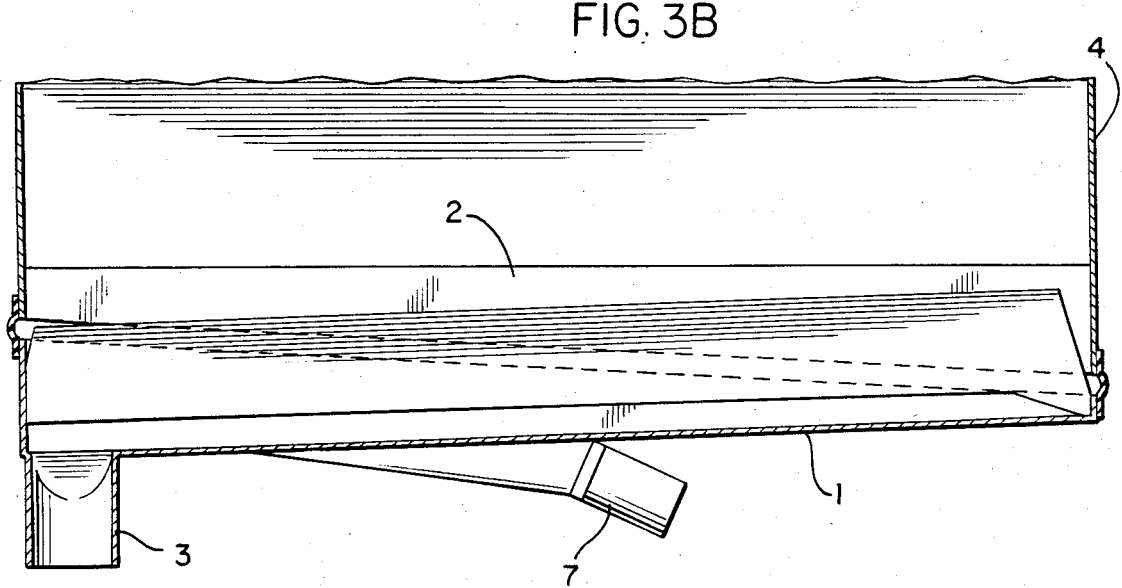
FIG. 3B is a diagrammatic transverse cross-section through the chute shown in FIG. 3A.
Figure 3C:
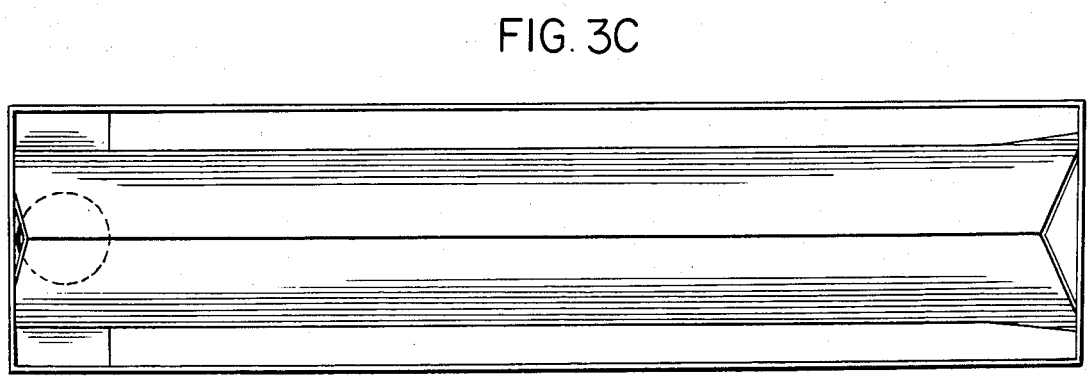
FIG. 3C is a top view of the chute shown in FIGS. 3A and 3B and FIG. 4 is a cross-sectional view, corresponding to FIG. 1, through another embodiment of the invention.

In the arrangement shown in FIGS. 3A, 3B and 3C the control member 2 is mounted on the chute 1, and thus moves in synchronism with the chute 1. FIG. 3 clearly illustrates how the control member is of elongate form, corresponding to the elongate form of the aperture formed at the base of the hopper. The control plate extends over substantially the entire length of the aperture formed at the base of the hopper.

Figure 4:
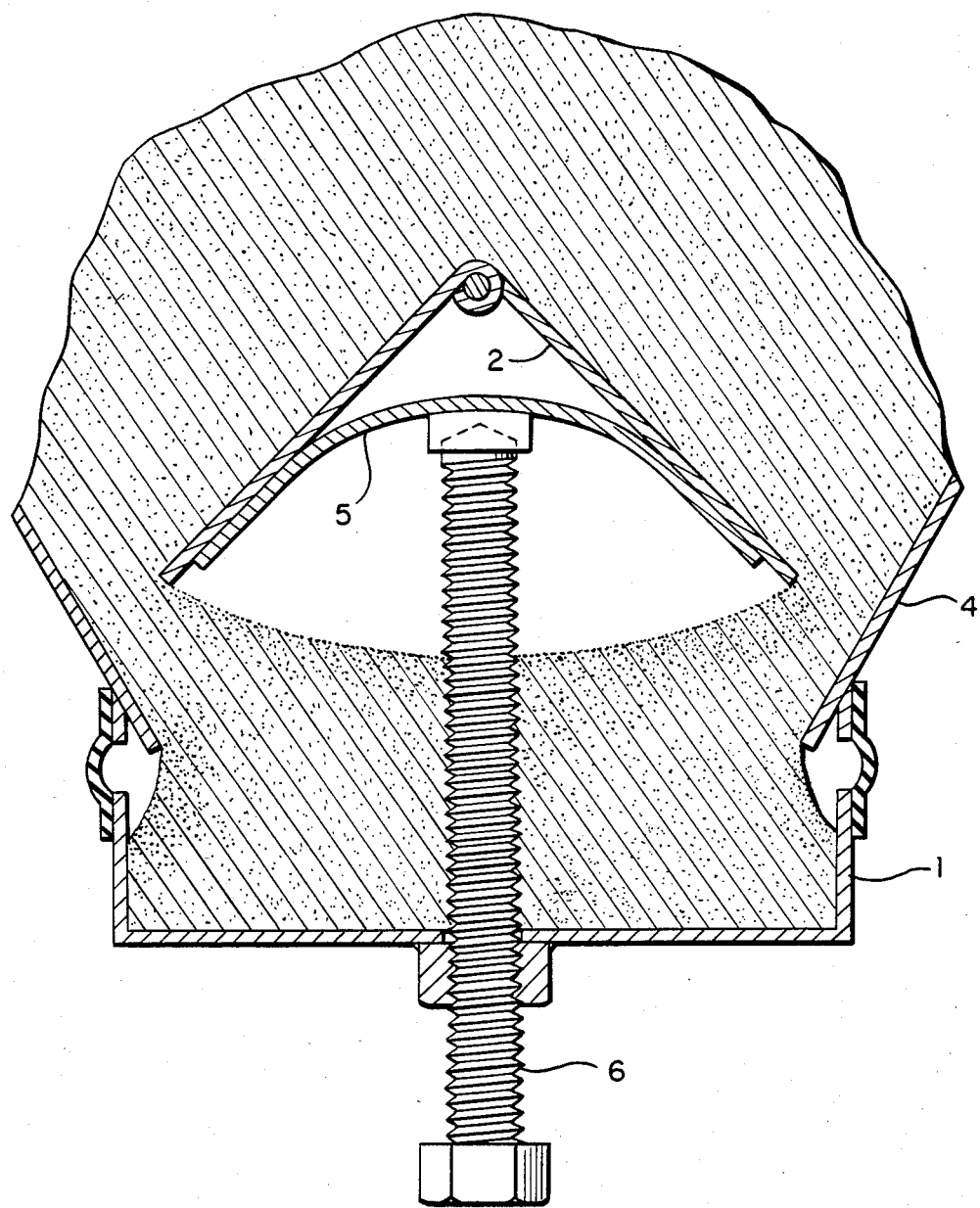

FIG. 4 illustrates a modified embodiment of the invention. The hopper having the converging side walls 4 is provided, and the chute 1 is provided, but the chute has less depth than the chute 1 shown in FIGS. 1 and 2.

Figure 8:
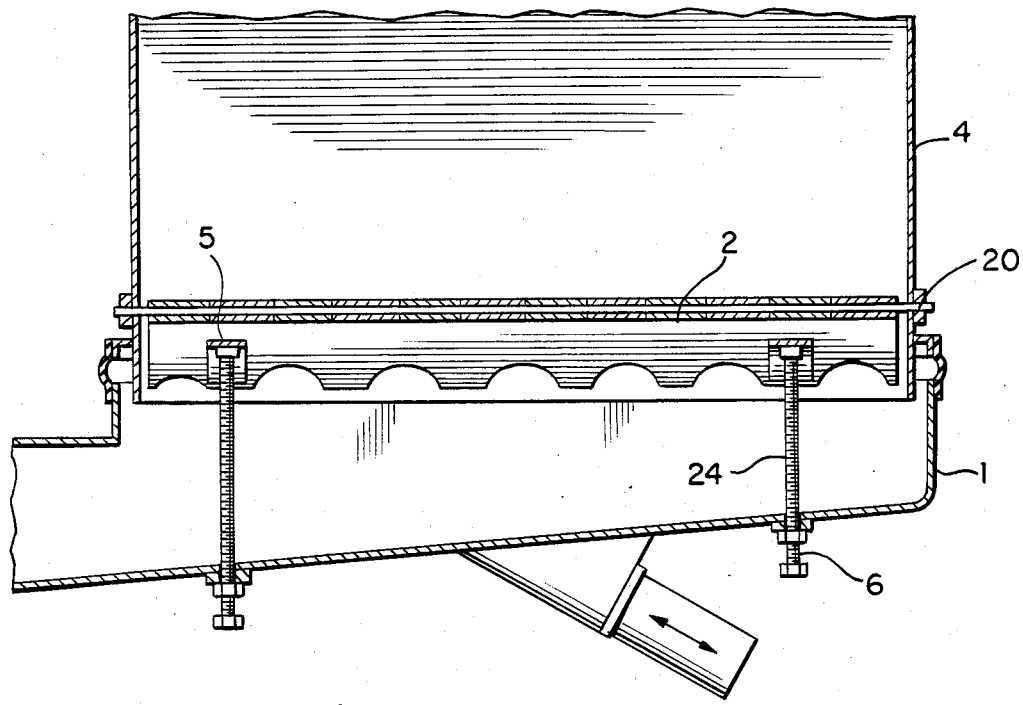
FIG. 8 illustrates the axis of the upper edges of the control member connected to the hopper.
Figure 9:
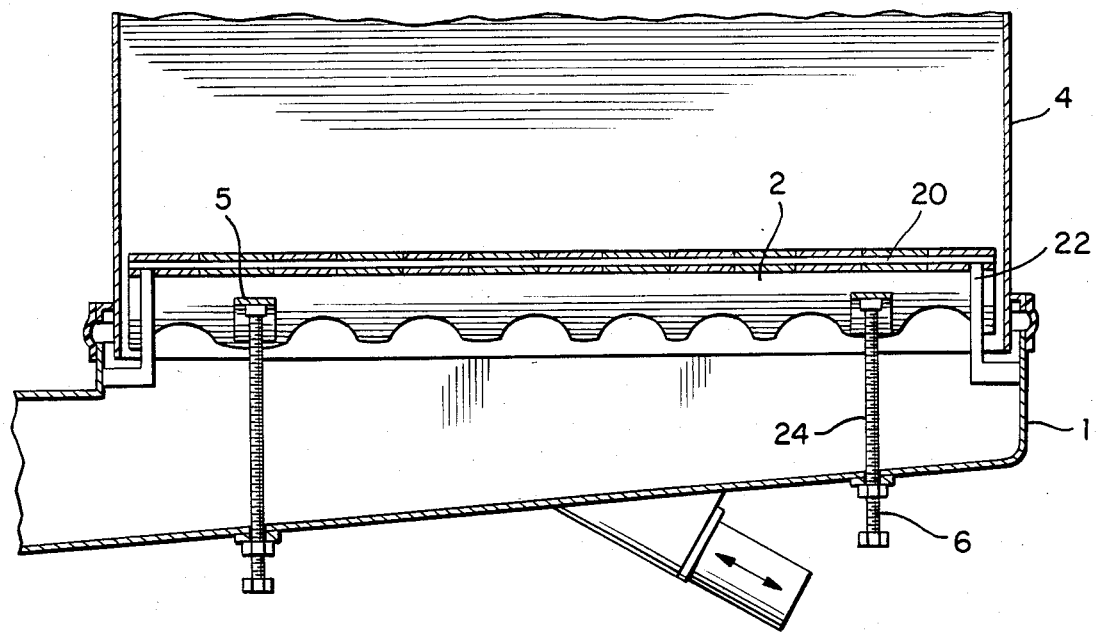
FIG. 9 illustrates the axis of the upper edges of the control member connected to the chute.

The control member 2 is located above the aperture formed by the converging side walls of the hopper 4 and has an elongate configuration corresponding to the elongate configuration of the control member shown in FIGS. 1 and 2. The control member 2 of the arrangement shown in FIG. 4 is mounted on the hopper and comprises two blades that are pivotally interconnected at their abutting upper edges. The axis 20 of the converging upper edges of the control member 2 is rotatably mounted in the side walls of the hopper 4 so that upon actuation of the threaded member 6, the blades of the control member are caused to spread out or move towards each other as shown in FIG. 8. In FIG. 9, mounting brackets 22 are shown connected at one end to the side walls of the chute 1 and at the other end to the axis 20 of the upper edges of the blades of the control member 2 which are pivotally interconnected. Upon actuation of the control member 6, rod 24 is caused to move vertically to force leaf spring 5 to force apart or bring together the blades of the control member 2 as they pivot about their axis 20. Thus the control member is of inverted apex configuration, but the angle of the blades can be adjusted. An arrangement is provided for adjusting the angle of the blades comprising a threaded member 6 which passes through a nut welded to the base of the chute 1 and through an aperture in the base of the chute 1. Thus the relative longitudinal position of the bolt 6 may be adjusted. At its upper end the bolt 6 is connected to an arcuate leaf spring 5 which is located under the two blades of the control member 2. Thus, as the bolt 6 is adjusted so the blades 2 of the control member, which is mounted on the hopper, tend to open and close. Thus the rate of flow of material through the aperture constituted by the converging side walls of the hopper 4 may be adjusted. The control member 2 vibrates with the chute or it may be suspended independently from the chute, in which case it does not vibrate.

The chute 1 shown in FIG. 4 will be provided with an outlet conduit 3 corresponding to that provided in the embodiment shown in FIGS. 1 and 2.

It is to be noted that in the described embodiments of the invention, discharge from the hopper takes places along its entire length. Consequently the powder and/or granular material is evenly discharged from the entire region within the hopper, and this is advantageous when compared with prior proposed arrangements having conical or pyrimidal control members associated with tubular outlets, since this leads to an uneven discharge, resulting in the formation of "wells" in the powder or granular material within the hopper.

Since the powder and/or granular material passing the control member enters the vibrating chute 1, an even flow of material emanates from the outlet conduit 3 and there is no arching or separation of the material into two divergent streams.

There is always a space located directly under the control member which is free from powdered material, and this facilitates the free flow of the powdered material through the chute by allowing the vibrated material to shift upwards momentarily into the said space. There is otherwise a danger of the material becoming compacted.

In order to increase the ability of the control member to break bridges in the powdered material, the control member is shaped with irregular edges, as shown in FIGS. 5A, 5B and 5C.

The hopper can be used for de-bagging big bags and this can be done by providing the control member with cutting knifes, as shown in FIGS. 6A, 6B and 6C.

Figure 7:
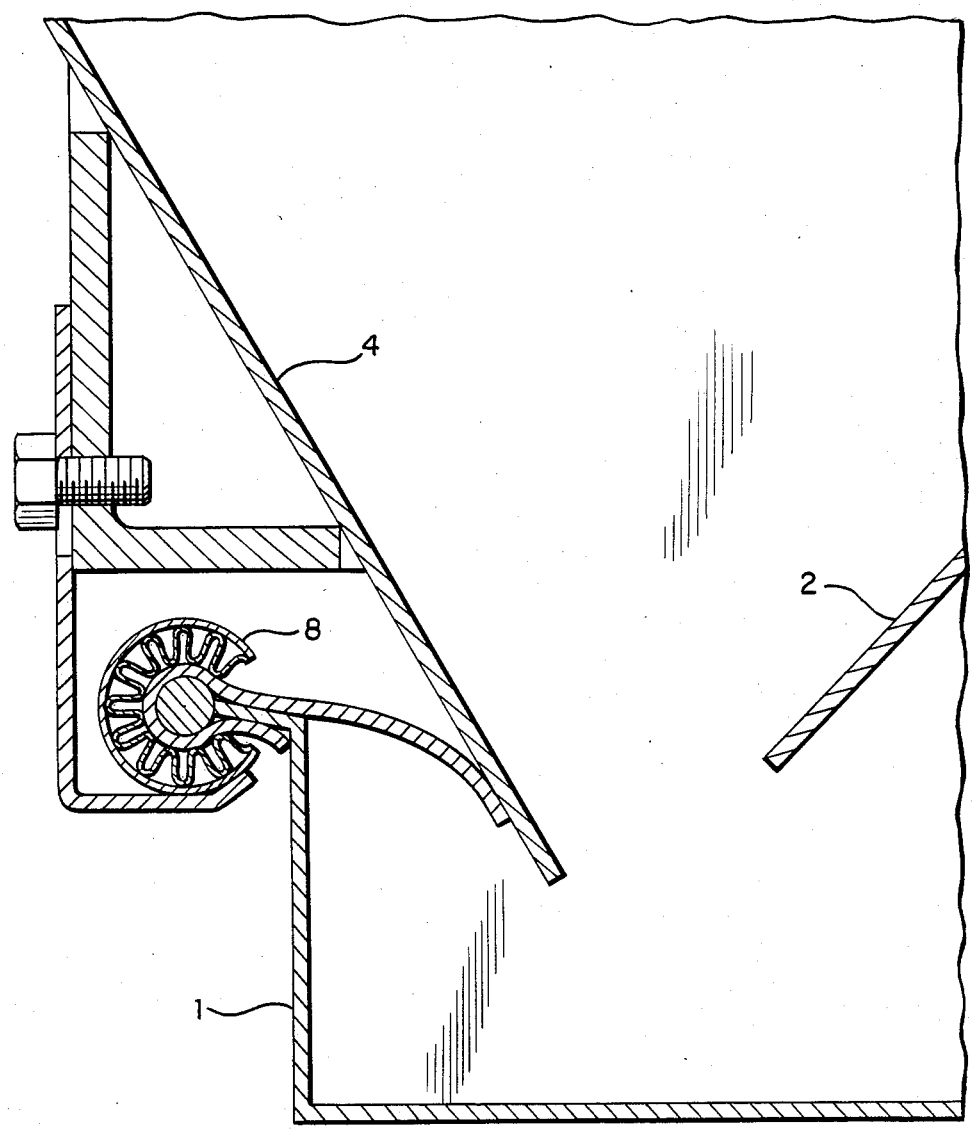
FIG. 7 is a cross section through the chute and the lower part of the hopper.

The chute can be supported in a resilient material with a free top surface allowing the chute to move freely upwards as shown in FIG. 7. The advantage of this design is that less power is needed for lifting the vibrating chute, and still keeping the sealing support 8 intact at the sealing surface of the unit 8.

The sealing ability increases with increased load from the powdered material in the chute.

The design allows easy access to the hopper and control member for maintenance and cleaning.

Whilst the invention has been described with reference to specific preferred embodiments it is to be appreciated that many modifications or improvements can be made without departing from the scope of the invention.

I claim:

1. An apparatus for discharging powder and/or pellets from a hopper having an outlet located adjacent its base, said apparatus comprising:
   a control member for controlling the rate of flow of said powder and/or pellets from said outlet, said control member comprises two abutting plates that are downwardly inclined from their point of abutment, said two abutting plates being hinged together at their point of abutment;
   adjustment means for adjusting the angular inclination between said two abutting plates, said adjustment means including a screw threaded member and a resilient spring, the resilient spring engaging the underside of said two abutting plates and being adjustable by rotation of the screw threaded member;
   a chute located under the control member to receive the powder and/or pellets; and
   an outlet defined by said chute for discharging the powder and/or pellets.

2. An apparatus according to claim 1 wherein means are provided for vibrating the hopper.

3. An apparatus according to claim 1 wherein means are provided for vibrating the chute.

4. An apparatus according to claim 1 wherein the control member is movable relative to the outlet defined at the base of the hopper.

5. An apparatus according to claim 1, wherein said outlet defined by said hopper is an elongate substantially rectangular outlet and said control member is an elongate substantially rectangular control member.

6. An apparatus according to claim 1 wherein the control member is mounted on the hopper.

7. An apparatus according to claim 1 wherein the control member is mounted on the chute.

8. An apparatus according to claim 1 wherein the hopper and the chute are interconnected by resilient sealing means.

9. An apparatus according to claim 1, wherein the control member is shaped with irregular edges.

10. An apparatus according to claim 1 wherein the control member forms a cutting knife.

11. An apparatus according to claim 1, wherein the chute is supported in a resilient bed which forms a sealing joint between the hopper and the chute.

* * * * *